US008407583B2

(12) United States Patent
Murai

(10) Patent No.: US 8,407,583 B2
(45) Date of Patent: Mar. 26, 2013

(54) INFORMATION PROCESSING APPARATUS, INFORMATION PROCESSING METHOD, COMPUTER-READABLE MEDIUM AND COMPUTER DATA SIGNAL

(75) Inventor: Tohru Murai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 631 days.

(21) Appl. No.: 12/629,696

(22) Filed: Dec. 2, 2009

(65) Prior Publication Data

US 2010/0325530 A1 Dec. 23, 2010

(30) Foreign Application Priority Data

Jun. 17, 2009 (JP) ................................. 2009-144042

(51) Int. Cl.
*G06F 17/00* (2006.01)

(52) U.S. Cl. ........ 715/234; 715/204; 715/749; 715/762; 717/109

(58) Field of Classification Search .................. 715/234, 715/749

See application file for complete search history.

(56) References Cited

U.S. PATENT DOCUMENTS

| | | | | | |
|---|---|---|---|---|---|
| 4,823,283 | A | * | 4/1989 | Diehm et al. ................. | 715/825 |
| 5,220,675 | A | * | 6/1993 | Padawer et al. .............. | 715/826 |
| 5,315,703 | A | * | 5/1994 | Matheny et al. .............. | 715/700 |
| 5,537,546 | A | * | 7/1996 | Sauter ........................... | 709/230 |
| 5,625,783 | A | * | 4/1997 | Ezekiel et al. ................ | 719/320 |
| 6,144,962 | A | * | 11/2000 | Weinberg et al. ................... | 1/1 |
| 6,792,454 | B2 | * | 9/2004 | Nakano et al. ............... | 709/219 |
| 6,990,654 | B2 | * | 1/2006 | Carroll, Jr. .................... | 717/109 |
| 7,765,485 | B2 | * | 7/2010 | Baker et al. ................... | 715/762 |
| 7,827,546 | B1 | * | 11/2010 | Jones et al. ................... | 717/173 |
| 7,844,907 | B2 | * | 11/2010 | Watler et al. .................. | 715/762 |
| 7,971,155 | B1 | * | 6/2011 | Yoon ............................. | 715/843 |
| 8,239,882 | B2 | * | 8/2012 | Dhanjal et al. ............... | 719/319 |
| 8,291,014 | B2 | * | 10/2012 | Cierniak et al. .............. | 709/203 |
| 2002/0054152 | A1 | * | 5/2002 | Palaniappan et al. ......... | 345/810 |
| 2004/0003054 | A1 | * | 1/2004 | Becker et al. ................. | 709/219 |
| 2007/0061487 | A1 | * | 3/2007 | Moore et al. ................. | 709/246 |

FOREIGN PATENT DOCUMENTS

JP 2007-141064 A 6/2007

OTHER PUBLICATIONS

Aspguy's Weblog "Pluggable Modules for ASP.NET", Jun. 9, 2009, pp. 1-6 http://aspguy.wordpress.com/2009/06/09/pluggable-modules-for-asp-net/.*

* cited by examiner

*Primary Examiner* — Stephen Hong
*Assistant Examiner* — Mario M Velez-Lopez
(74) *Attorney, Agent, or Firm* — Sughrue Mion, PLLC

(57) ABSTRACT

An information processing apparatus comprises a memory that stores structure information indicating a structure of functions of a Web application. Upon acquiring extension page information defining an extension function of the Web application, the apparatus sets up the extension page information in the memory according to a setup command, and determines, based on the setup command and the structure information, an insertion position of the extension function in the structure of functions of the Web application. Then, upon receipt of a request for generation of a Web page that represents the structure of functions of the Web application, the apparatus generates an extended Web page based on the structure information and the insertion position, by inserting extension function information indicating the extension function into a Web page according to the structure information.

13 Claims, 6 Drawing Sheets

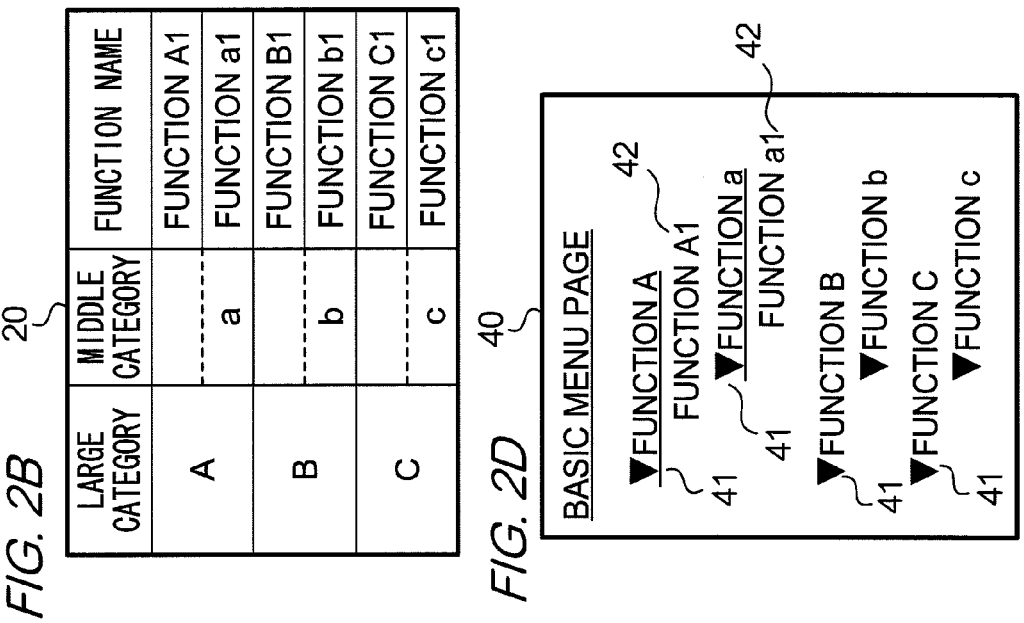
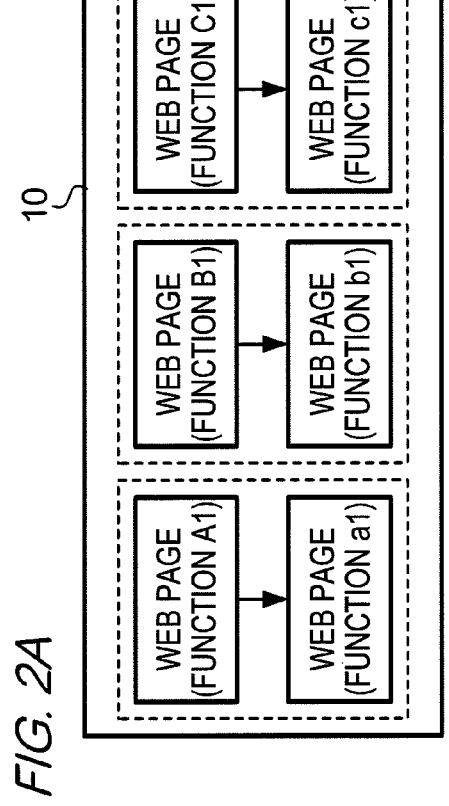

```
<value>
  <struct>
    <member>
      <name>servicename</name>           ⎫
      <value><string>function a2</string></value>  ⎬ 61
    ......                                ⎭
      <name>category</name>              ⎫
      <value><string>a</string></value>  ⎬ 62
    ......                                ⎭
```

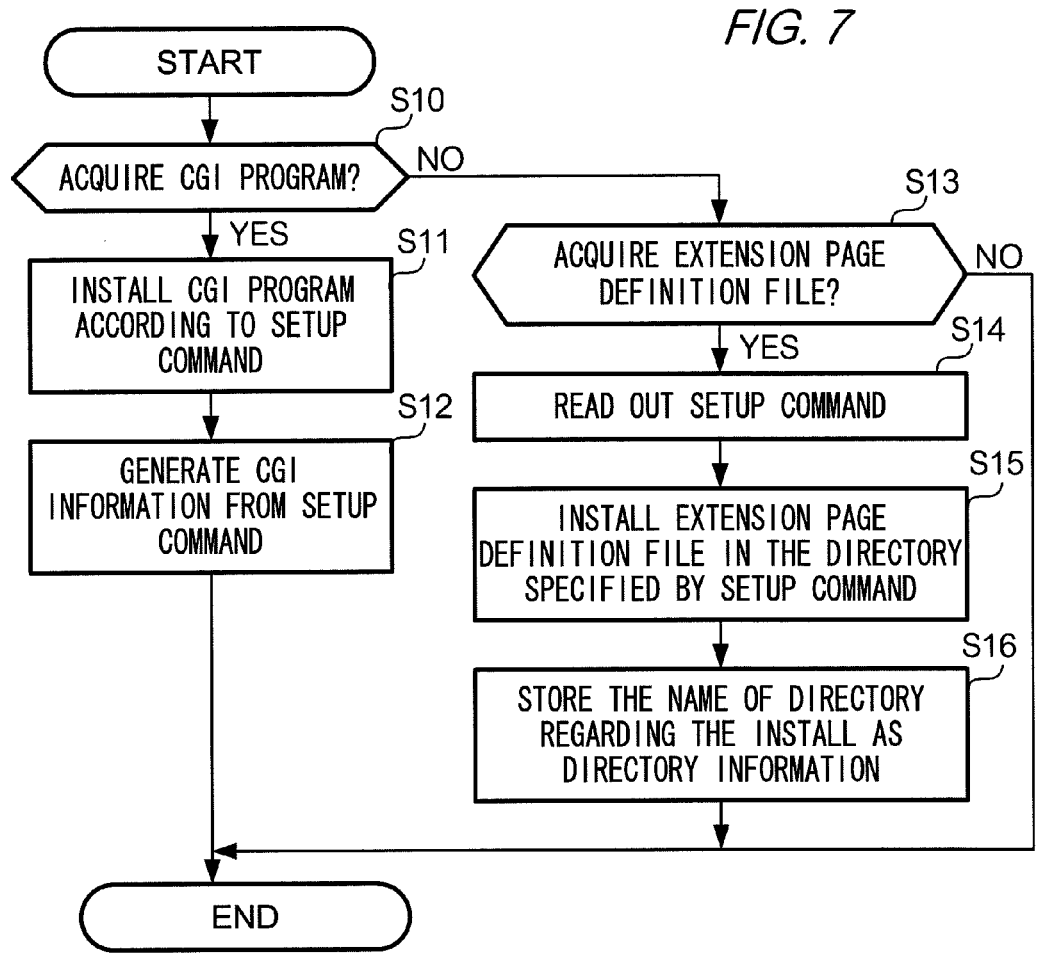
FIG. 7
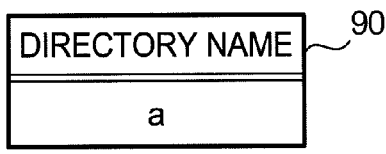
FIG. 8
| EXTENSION FUNCTION NAME | CATEGORY NAME | CGI NAME AND PARAMETERS |
|---|---|---|
| FUNCTION a2 | a | /**a2.cgi?Action= |
| FUNCTION a3 | a | /**a3.cgi?Action= |
FIG. 9
| DIRECTORY NAME |
|---|
| a |

INFORMATION PROCESSING APPARATUS, INFORMATION PROCESSING METHOD, COMPUTER-READABLE MEDIUM AND COMPUTER DATA SIGNAL

CROSS-REFERENCE TO RELATED APPLICATIONS

This application is based on and claims priority under 35 U.S.C. 119 from Japanese Patent Application No. 2009-144042, which was filed Jun. 17, 2009.

BACKGROUND

1. Technical Field

The present invention relates to an information processing apparatus, an information processing method, a computer-readable medium and a computer data signal.

2. Related Art

Various technologies have been proposed for generating a menu page of an application in accordance with extension of function of the application.

SUMMARY

In a case where a function of a Web (World Wide Web) application is extended, as a method for generating a new menu page that includes an existing menu page of the Web application having a menu item(s) of the extended function added, it may be conceivable to modify the existing menu page to a new menu page or, in the case of a blog or the like, to use a GUI (Graphical User Interface) to edit a database for defining the menu page and dynamically generate the menu page. Also, in such a case that a common menu page is provided to multiple clients, it is desirable that a new menu page in accordance with an extended function be provided without changing the structure of the existing menu page.

According to an aspect of the present invention, there is provided an information processing apparatus including: a memory that stores a Web application and structure information indicating a structure of functions predefined in the Web application; an acquisition unit that acquires extension page information that describes an extension function of the Web application; a setup unit that sets up the extension page information acquired by the acquisition unit in the memory according to a setup command; a determination unit that determines, based on the setup command and the structure information, an insertion position of the extension function of the extension page information in the structure of functions of the Web application; a request receiving unit that receives a request for generation of a Web page that represents the structure of functions of the Web application; and a page generation unit that, upon receipt of the request, generates an extended Web page based on the structure information stored in the memory and the insertion position determined by the determination unit, by inserting extension function information indicating the extension function into a Web page according to the structure information.

BRIEF DESCRIPTION OF THE DRAWINGS

Exemplary embodiment(s) of the present invention will be described in detail based on the following figures, wherein:

FIG. 2A illustrates an existing page structure of a Web application 10 in an exemplary embodiment of the invention;

FIG. 2B is a diagram for explaining categories of Web pages of Web application 10 in an exemplary embodiment of the invention;

FIG. 2C shows an example of menu definition information of Web application 10 in an exemplary embodiment of the invention;

FIG. 2D illustrates an example of a basic menu page of Web application 10 in an exemplary embodiment of the invention;

FIG. 7 is a flowchart showing an initial setup process of image-processing apparatus 100 in an exemplary embodiment of the invention;

FIG. 8 shows an example of CGI information 80 in an exemplary embodiment of the invention;

FIG. 9 shows an example of directory information 90 in an exemplary embodiment of the invention;

DETAILED DESCRIPTION

Exemplary Embodiment

Figure 1:
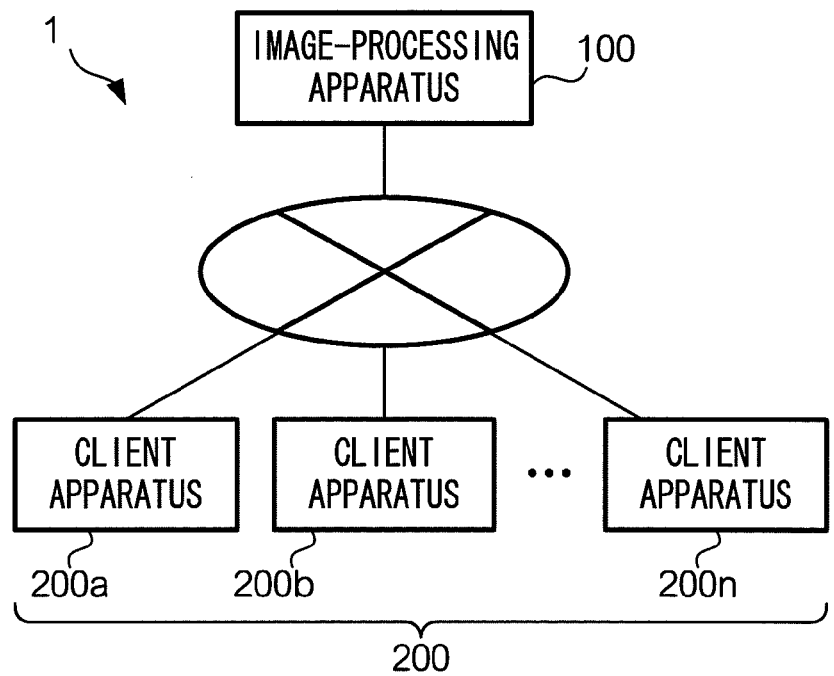
FIG. 1 shows an example of a system configuration of an exemplary embodiment of the invention.

FIG. 1 shows an example of system configuration of an exemplary embodiment of the present invention. An information processing apparatus of the exemplary embodiment of the invention is embodied as an image-processing apparatus 100 having various functions such as copy function, printer function, facsimile sending and receiving function, etc., and is connected via an intranet to client apparatuses 200a-200n (hereinafter referred to as client apparatus(es) 200 when individual client apparatuses need not be distinguished from each other), which can be embodied as personal computers (PCs).

Image-processing apparatus 100 has a function of a Web server for communicating data in the form of HTML (Hyper Text Markup language) or the like with client apparatuses 200 following a communication protocol of HTTP (Hyper Text Transfer Protocol). Image-processing apparatus 100 also has a Web application(s) for notifying client apparatuses 200 of a state of operation of the above-mentioned various functions, performing setup of various functions according to instructions from client apparatuses 200, and so on.

Now, explanation will be made of the Web application in the present exemplary embodiment.

Web Application

A Web application is typically constituted by XML file(s) in that Web pages for providing client apparatuses 200 with various functions of the Web application are written in XML language, and/or CGI program(s) for generating such Web pages. The Web pages of the Web application are classified into categories based on their functions, and are linked to other Web pages.

When a function of the Web application is provided to a client apparatus 200, a menu page showing the categories of Web pages and the link relationship between Web pages in a hierarchical structure is sent to client apparatus 200, so that the menu page is displayed by a Web browser of client apparatus 200.

FIG. 2A shows an example of the structure of Web pages of a Web application according to the exemplary embodiment of the invention. As shown in FIG. 2A, a Web application 10 is constituted by Web pages for functions A1-C1 and Web pages for functions a1-c1 that are linked to the Web pages for functions A1-C1, respectively. FIG. 2B is category information that shows categories assigned to the Web pages of FIG. 2A.

As shown in category information 20 of FIG. 2B, each Web page of FIG. 2A is assigned a large category and/or a middle category. In the example shown, the Web pages of function names "Function A1" and "Function a1" are categorized into a large category "A", and further, the Web page of Function a1 is categorized into a middle category "a."

In the present exemplary embodiment, the categories are defined according to the contents and/or types of the functions. Thus, for example, in a case that image-processing apparatus 100 has a function for performing network setup as well as a function for performing protocol setup as a function related to the network setup, the network setup corresponds to the large category, and the protocol setup corresponds to the middle category.

Image-processing apparatus 100 stores a menu definition file that predefines a menu page (hereinafter referred to as a "basic menu page") according to the structure of Web pages shown in FIGS. 2A and 2B. FIG. 2C shows an example of the menu definition file written in XML language. As shown in FIG. 2C, in a menu definition file (which may be also referred to as menu definition information) 30, <category> tag 31 defines the above-mentioned category "A" and tags 32 and 33 set a corresponding category name "Function A" in English and Japanese, respectively, which is used as an index in the basic menu page.

Further, <servicename> tag 34 defines a function name "Function A1" of the Web page that belongs to the category "A" as a menu item, and <actionname> tag 35 defines a path and parameters of a CGI used in generating the Web page of Function A1. It should be understood that menu definition file 30 defines similar information for the other categories, though the description of such information in the drawing is omitted. As described above, menu definition file 30 defines category names that indicate hierarchical levels in a hierarchical structure of Web pages of Web application 10 and, in accordance with the hierarchical structure, defines the positions of the menu items and indices corresponding to the category names in the menu page. It is to be noted that the tags used in FIG. 2C are exemplary, and the present invention should not be limited thereto so long as the function names and category names of Web pages are appropriately defined.

FIG. 2D shows an example of the basic menu page according to menu definition file 30. As shown in FIG. 2D, in a basic menu page 40, indices 41 corresponding to the categories defined in menu definition file 30 and function names 42 of Web pages belonging to each category are displayed in a hierarchical structure, where the function names 42 are displayed as menu items.

The structure of the existing Web pages of Web application 10 (hereinafter referred to as the "existing page structure") and the menu definition file of the basic menu page according to the exemplary embodiment of the invention are explained above. Image-processing apparatus 100 inserts a Web page of an extension function (hereinafter referred to as an "extension page") into the existing page structure and generates an extended menu page that is inserted with a menu item of the extension function without altering menu definition file (menu definition information) 30. In the following, the structure of image-processing apparatus 100 will be described.

Structure of Image-Processing Apparatus 100

Figure 3:
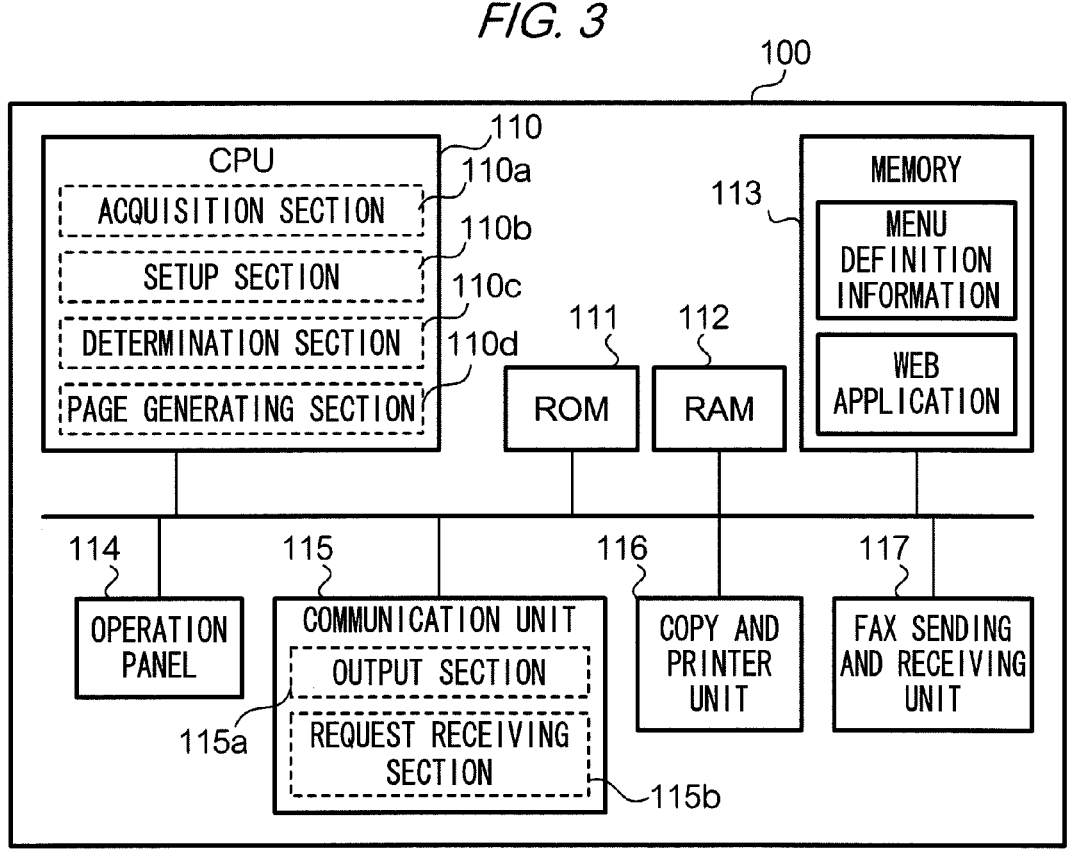
FIG. 3 is a block diagram of an image-processing apparatus 100 in an exemplary embodiment of the invention.

FIG. 3 is a block diagram of an exemplary embodiment of image-processing apparatus 100. As shown in FIG. 3, image-processing apparatus 100 includes CPU 110, ROM 111, RAM 112, memory 113, operation panel 114, communication unit 115, copy and printer unit 116, and FAX sending and receiving unit 117.

CPU 110 executes a control program stored in ROM 111 while using RAM 112 as a working area to perform functions of acquisition section 110a, setup section 110b, determination section 110c and page generating section 110d, and to control the devices connected to CPU 110.

Specifically, acquisition section 110a has a function to acquire an item(s) of extension page information, which may be a file that defines an extension page in XML language (hereinafter referred to as an "extension page definition file") or a CGI program for generating an extension page.

In the described exemplary embodiment, the extension page information is transmitted from a client apparatus 200 but the extension page information may be input by an operation by a user via an interface (not shown in the drawings) such as a USB (Universal Serial Bus) or may be pre-stored in memory 113.

Setup section 110b has a function of installing the item(s) of extension page information (CGI program, extension page definition file) acquired by acquisition section 110a into a predetermined directory in memory 113 following a setup command for each item of extension page information. When the item of extension page information is a CGI program, the setup command for installing the CGI program specifies a name of directory to which the CGI program is to be installed, an extension function name that refers to the extension function implemented by executing the CGI program, a name of a category to which the extension function belongs, and a path of CGI (hereinafter referred to as a "CGI name") and parameters for generating the extension page of the CGI program.

In a case where the item of extension page information is an extension page definition file, the name of directory in which the extension page definition file is to be installed is specified by a user operation or a setup command pre-stored in memory 113, and the extension page definition file is stored in the directory having the specified directory name.

Determination section 110c extracts, as insertion position information, the category name, extension function name, and CGI name and parameters of the CGI program from the setup command that was used by setup section 110b when setting up the CGI program, and based on the extracted information, determines an insertion position of the extension function of the CGI program in the Web application. In a case where setup section 110b has set up an extension page definition file, determination section 110c determines the insertion position from the name of a directory in which the extension page definition file has been set up.

Page generating section 110d has a function of generating an extended menu page from menu definition information 30 and the insertion position(s) determined by determination section 110c when a client apparatus 200 requests a menu page of Web application 10.

Next, an explanation will be made of memory 113. Memory 113 includes a storage medium such as a hard disk, and stores various programs such as Web application 10 and various items of data such as menu definition information 30.

Figure 4:
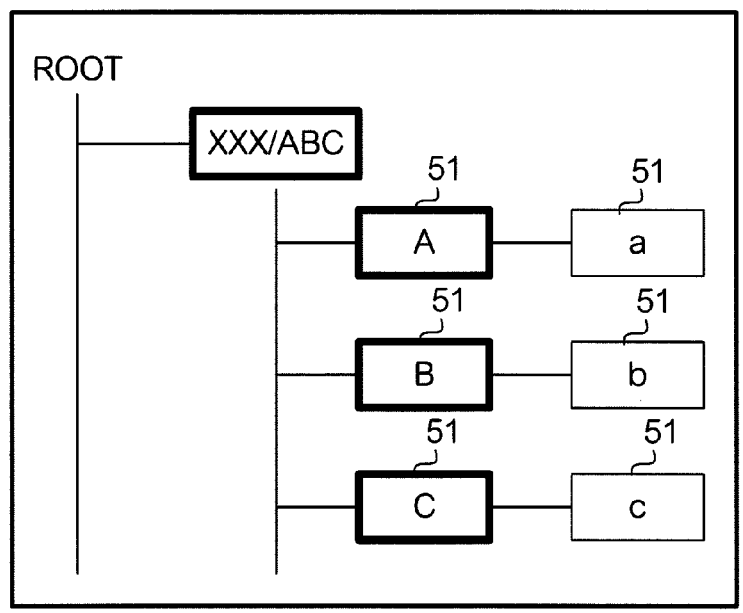
FIG. 4 shows a directory structure of Web application 10 in an exemplary embodiment of the invention.

Here, the directory structure of Web application 10 installed in memory 113 before extension of function will be explained. FIG. 4 schematically shows an example of the directory structure of Web application 10 set in memory 113. In FIG. 4, Web application 10 is installed under a directory "XXX/ABC," and directories 51 are set under the directory "XXX/ABC" in accordance with the categories of Web application 10. In this example, directories A, B, and C are at an upper hierarchy level and directories a, b, and c are set immediately below these upper hierarchy directories, respectively. Thus, in this exemplary embodiment, each directory 51 is provided with a directory name that is the same as one of the category names of Web application 10, and each directory 51 stores one or more files (CGI program, XML file, etc.) relating to the Web page(s) of a function(s) belonging to the category associated with the directory.

In another exemplary embodiment, directories 51 may be provided so as to correspond to the functions of Web application 10 instead of the categories, so that one or more files relating to each function (or Web page) are stored in the corresponding one of directories 51. In such a case, each directory 51 may be provided with a directory name that is the same as or uniquely associated with the name of its corresponding function.

In general, an arbitrary directory structure may be used for the embodiment of the present invention so long as each directory 51 stores files relating to a Web page or Web pages belonging to the same category but does not store files relating to Web pages belonging to different categories. In other words, each directory 51 is associated with one or more of the Web pages (or functions) belonging to the same category.

In memory 113 constructed as above, menu definition information 30 written in XML language is pre-stored in the directory "XXX/ABC" of FIG. 4, and the file of menu definition information 30 is provided with an extension "conf," for example.

Next, the CGI program and the extension page definition file, which may be installed in memory 113, will be described. It should be noted that the following description relates to a case where the CGI program and the extension page definition file extend the existing page structure shown in FIG. 2A.

Figures 5, 6:
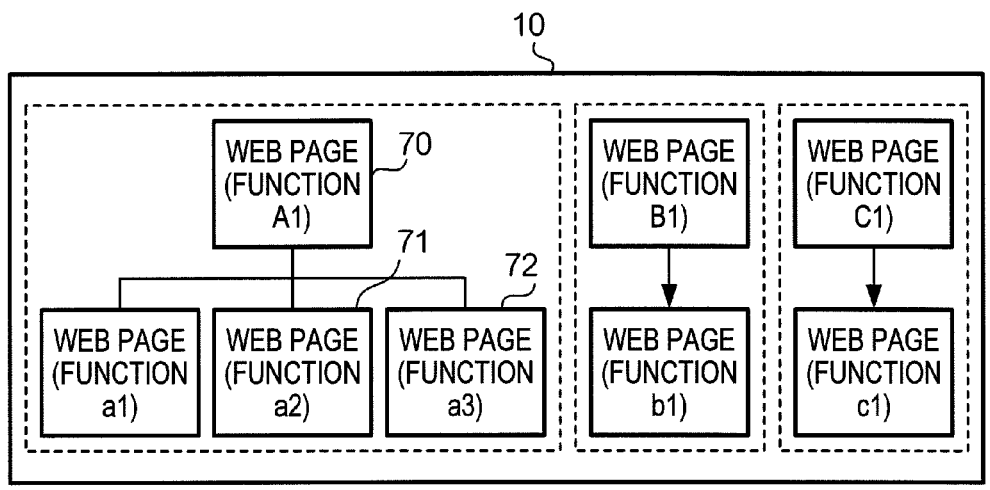
FIG. 5 shows an example of a content of an extension page definition file in an exemplary embodiment of the invention.
FIG. 6 illustrates a page structure after extension of function of Web application 10 in an exemplary embodiment of the invention.

First, the extension page definition file will be described with reference to FIG. 5. FIG. 5 shows an exemplary content of the extension page definition file written in XML language. Extension page definition file 60 of FIG. 5 defines a structure of extension page, etc. Further, in this exemplary embodiment, the extension page definition file is provided with an extension "conf."

In extension page definition file 60 of FIG. 5, a tag 61 defines "Function a2" as "servicename," and a tag 62 defines "a" as "category," for example. This indicates that an extension page of Function a2 is to be inserted in the middle category "a" and "Function a2" is to be used as the name of extension function of this extension page, or as a menu item. It should be noted that, though not shown in the drawing, information regarding the form of extension page of Function a2 is also defined in extension page definition file 60.

FIG. 6 shows the page structure after extension pages are inserted into the existing page structure shown in FIG. 2A. As shown in FIG. 6, an extension page 71 of Function a2 is added under a Web page 70 of Function A1, whereby the function of Function A1 is extended. Similarly, an extension page 72 of Function a3 is defined in extension page definition file 60 to further extend the function of Function A1. As described above, an extension page definition file contains an extension function name that refers to an extension function and insertion position information that indicates where the extension page is to be inserted, i.e., a category name defined in menu definition information 30.

Next, explanation will be made of the CGI program. Though an exemplary embodiment of the CGI program is not shown in the drawings, it should be understood that the CGI program defines contents of processes for implementing the extension function, and a file of CGI program is provided with an extension "cgi."

Referring again to FIG. 3, explanation of the structure of the image-processing apparatus 100 is continued.

Operation panel 114 may include a ten-keypad and arrow keys for operating image-processing apparatus 100, and is adapted to forward to CPU 110 information according to a user operation. Communication unit 115 functions under a control of CPU 110 to realize functions of an output section 115a for outputting data of a Web page to client apparatuses 200 following HTTP protocol and a request receiving section 115b for receiving a request for a Web page from client apparatuses 200, to thereby conduct data communications to and from client apparatuses 200. In addition to receiving a request for a Web page from client apparatuses 200, communication unit 115 receives from client apparatuses 200 various items of data, and destination information that indicates the destination(s) of the data, and forwards the various items of data to the destination(s) based on the received destination information.

Copy and printer unit 116 has a function of copying a document or the like in response to a user operation and a printer function of receiving print data written in a page description language from client apparatuses 200, developing the print data, and printing an image of the developed print data on a medium such as a sheet of paper. FAX sending and receiving unit 117 is connected to a public network, and has a function of sending FAX destination-specified data received from client apparatuses 200 or document data of which a FAX destination has been specified by a user using operation panel 114 to the specified destination, and receiving document data from outside via the public network and outputting the received data onto a paper medium.

The structure of image-processing apparatus 100 has been described above. Each client apparatus 200 in this exemplary embodiment is constituted by a personal computer (PC) or the like connected to image-processing apparatus 100 via an intranet, as described above. Each client apparatus 200 has a function of sending a request for a Web page of Web application 10 via a browser to image-processing apparatus 100 following the HTTP protocol in response to a user operation, and a function of receiving Web page data sent from image-processing apparatus 100 via a browser to thereby show the Web page on a display provided to client apparatus 200.

Operation (Initial Setup Process)

Now, an operation of image-processing apparatus 100 according to the exemplary embodiment of the invention will be described. FIG. 7 is an operational flowchart showing an initial setup process of image-processing apparatus 100.

In step S10 of FIG. 7, when extension page information of Web application 10 is sent from a client apparatus 200 according to a user operation, CPU 110 of image-processing apparatus 100 acquires the extension page information via communication unit 115. In a case where the acquired extension page information is a CGI program, i.e., when the extension page information is cgi (step S10: YES), CPU 110 executes the setup command described above to install the CGI program in the directory specified by the setup command (step S11).

The setup command may be a command prepared by the user, and may be sent together with the file of CGI program from client apparatus 200 or stored beforehand in a predetermined region of memory 113 according to an operation by the user using client apparatus 200. Also, as mentioned above, the setup command sets forth a name of the directory in which the CGI program is to be installed, a category name of the extension function of the CGI program, extension function name, CGI name and parameters.

Next, CPU 110 extracts the extension function name, category name, CGI name and parameters set forth by the setup command used in step S11 for installing the CGI program, and stores the extracted information in memory 113 as CGI information, i.e., insertion position information, as exemplarily shown in FIG. 8 (step S12). As shown in FIG. 8, in the CGI information 80, the extracted extension function name 81, category name 82 and the CGI name and parameters 83 of each extension function are associated to each other. In this example, it is indicated that the extension pages of Function a2 and Function a3 are inserted into the middle category "a."

Referring again to FIG. 7, if it is determined in step S10 that the acquired extension page information is an extension page definition file instead of a CGI program, i.e., if the extension of the extension page information is "conf" (step S10: NO, step S13: YES), CPU 110 reads out from memory 113 a setup command that specifies the directory to which the extension page definition file is to be installed (step S14) and installs the extension page definition file to the directory in memory 113 specified by the setup command (step S15). In the following description of the present exemplary embodiment, it is assumed that the extension page definition file has been installed in the directory "a" below the directory "XXX/ABC/A" shown in FIG. 4. Therefore, the directory "a" is associated with Function a1 of the Web application as well as the extension functions Function a2 and Function a3.

It should be noted, however, that if the directories are provided so as to correspond to the functions of Web application 10 instead of the categories, for example, it is possible to create a new directory in memory 113, such as a directory "a2," directory "a3" or directory "a2+a3," for installing the added extension page definition files. Thus, each directory in memory 113 is associated with one of the extension functions and functions of Web application 10 (such as directory "a2" and directory "a3" which are associated with extension functions Function a2 and Function a3, respectively) or more than one of the extension functions and functions of the Web application that belong to a same category (such as directory "a2+a3" which is associated with both of the extension functions Function a2 and Function a3 belonging to the same category "a" or directory "a" which is associated with Function a1, Function a2 and Function a3 all belonging to the category "a").

CPU 110 stores in memory 113 the directory name "a," where the extension page definition file has been installed, as directory information 90 shown in FIG. 9, which serves as insertion position information (step S16).

Referring again to FIG. 7, if it is determined in step S13 that the data acquired by CPU 110 via communication unit 115 is not an extension page definition file (step S13: NO), the initial setup process is ended.

(Menu Page Generation Process)

Figure 10:
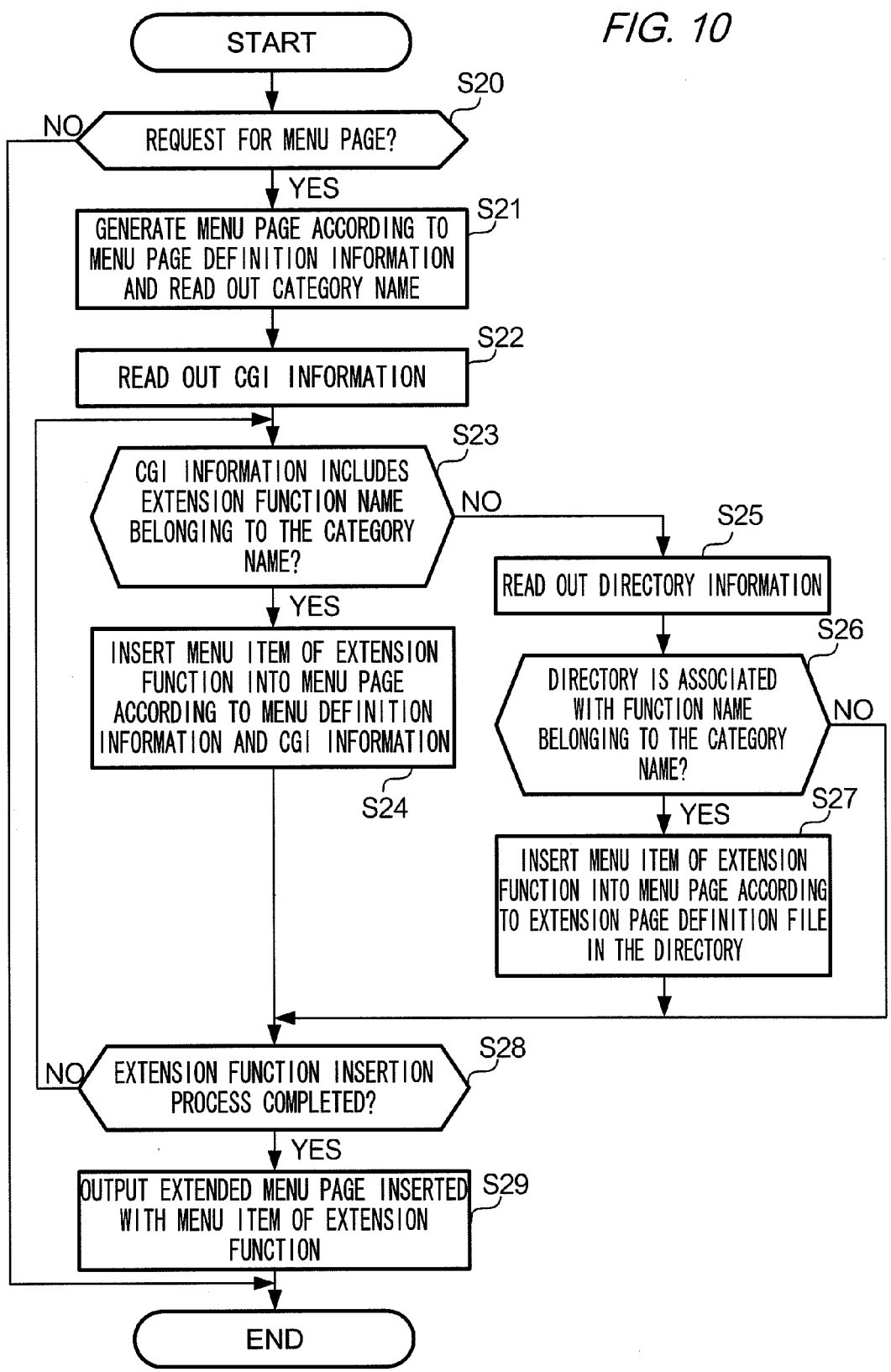
FIG. 10 is a flowchart showing a menu page generation process of an image-processing apparatus 100 in an exemplary embodiment of the invention.

Next, an operation of a menu page generation process, which may be conducted in response to a request for a Web page of Web application 10 sent from a client apparatus 200, will be described. FIG. 10 is an operational flowchart showing a menu page generation process of image-processing apparatus 100.

When an operation is performed by a user in a client apparatus 200 to specify a URL (Uniform Resource Locator) or URI (Uniform Resource Identifier) that refers to the menu page of Web application 10, the browser of client apparatus 200 sends a command for requesting the menu page to image-processing apparatus 100.

Upon receiving the menu page request command from client apparatus 200 (step S20: YES), CPU 110 of the image-processing apparatus 100 reads out menu definition information 30 from memory 113, generates a menu page based on menu definition information 30, and reads out the category names defined in menu definition information 30 one at a time (step S21). If it is determined in step S20 that there is no menu page request command received, the menu page generation process is ended (step S20: NO).

CPU 110 reads out CGI information 80 from memory 113 (step S22), and determines whether an extension function name belonging to the category name read out in step S21 is included in CGI information 80 (step S23). If it is determined that CGI information 80 includes an extension function name belonging to the category name (step S23: YES), CPU 110 inserts the extension function name, which is associated with the category name in CGI information 80, into a portion of the menu page corresponding to the category name. Further, CPU 110 relates the CGI name and parameters that are associated with the category name and extension function name in CGI information 80 to the extension function name inserted into the menu page (step S24).

In a case where menu definition information 30 defining the basic menu page is written in a markup language such as XML language as shown in FIG. 2C, to insert the extension function name into the basic menu page and relate the CGI name and parameters to the extension function name, page generation section 110d may create a copy of menu definition information 30 and edit the copy to insert therein tag statements (such as <servicename> tag 34 and <actionname> tag 35 in FIG. 2C) that define the extension function name, CGI name (or path) and parameters of the extension file at a position indicated by the category name, whereby the edited copy defines the extended menu page that has the function name (menu item) of the extension function inserted.

Also, if it is determined in step S23 that CGI information 80 does not include an extension function name belonging to the read out category name (step S23: NO), CPU 110 reads out directory information 90 from memory 113 (step S25), and determines whether the directory name stored in directory information 90 is associated with a function name belonging to the category name read out in step S21 (step S26). If it is determined in step S26 that the directory name(s) in directory information 90 is associated with a function name belonging to the read out category name (step S26: YES), CPU 110 reads out an extension page definition file(s) from the directory in memory 113 specified by the directory name. Then, CPU 110 extracts an extension function name defined in the extension page definition file, i.e., menu item name, and inserts the extracted extension function name into a portion in the menu page that corresponds to the read out category name (step S27).

In this case also, when menu definition file 30 is written in XML language, page generation section 110d may create a copy of the menu definition file and edit the copy to insert therein appropriate tag statements that define the extension function name at a position indicated by the category name so that the edited copy defines the extended menu page that has the function name (menu item) of the extension function inserted.

For example, if the category name read out in step S21 is a middle category "a" and CGI information 80 (FIG. 8) includes extension function names "Function a2" and "Function a3" that belong to category "a," the extension function names "Function a2" and "Function name a3" included in CGI information 80 are inserted as menu items in the menu page according to menu definition information 30 (FIG. 2D), at a position below the function name "Function a1," which belongs to the index "Function a" corresponding to the category "a." Then, the CGI names and parameters for generating the extension pages relating to the inserted extension function names "Function a2" and "Function a3" are linked to these extension function names.

Also, if the directory name stored in directory information 90 (FIG. 9) is "a," i.e., the function name(s) associated with the directory name belongs to category "a," the function names "Function a2" and "Function a3," which are defined as "servicename" in extension page definition file 60 stored in the directory "a" of memory 113, are extracted. Then, in the same way as described above, the extracted extension function names "Function a2" and "Function a3" are inserted as menu items in the menu page according to menu definition information 30 (FIG. 2D), at a position below the function name "Function a1" which belongs to the index "Function a" corresponding to category "a."

Referring again to FIG. 10, if it is determined in step S26 that the directory name in directory information 90 is not associated with the function name(s) belonging to the category name read out in step S21 (step S26: NO), CPU 110 determines whether the extension function insertion process of steps S23-S27 has been completed for all of the category names contained in menu definition information 30 (step S28), and if it is determined that the extension function insertion process has been completed for all of the category names (step S28: YES), CPU 110 outputs to client apparatus 200 the extended menu page that has the extension function(s) inserted as a result of the extension function insertion process (step S29). It should be noted that the extended menu page and extension page generated by image-processing apparatus 100 can be Web pages in HTML format, and client apparatus 200 can display the extended menu page and extension page in HTML format sent from image-processing apparatus 100 by using a browser program.

Figure 11:
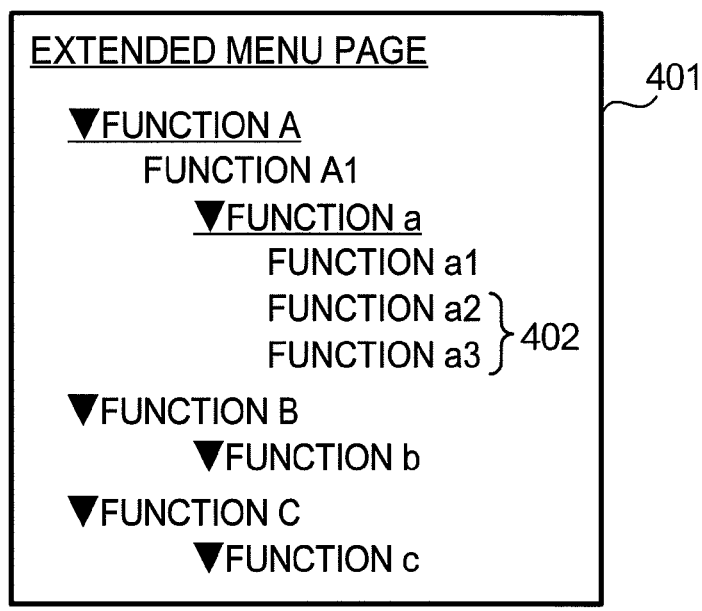
FIG. 11 shows an example of an extended menu page in an exemplary embodiment of the invention.

Further, if it is determined that the extension function insertion process has not been completed for all of the category names (step S28: NO), CPU 110 repeats the process from step S23 to step S27. FIG. 11 shows an example of the extended menu page for Web application 10 having the extension functions Function a2 and Function a3 inserted thereinto. In the illustrated extended menu page 401, in a case where Function a2 and Function a3 designated with a numeral 402 are extension functions derived by CGI programs, when Web pages regarding these functions are demanded from a client apparatus 200 according to a user operation, CPU 110 executes the CGI programs on the basis of the CGI name and parameters associated with respective extension function names to generate demanded extension pages, and outputs them to client apparatus 200. Also, in a case where Function a2 and Function a3 are defined by extension page definition files, CPU 110 generates extension pages on the basis of the extension page definition files of respective functions, and outputs the extension pages to client apparatus 200.

In the present exemplary embodiment, in each of the cases where an extension page is defined by a CGI program and where an extension page is defined in XML language, the extension page is inserted into an existing page structure of a Web application, and an extended menu page that has a menu item corresponding to the extension page inserted thereinto is generated while maintaining the menu structure of the basic menu page.

Modified Embodiments

In the following, modified embodiments of the present invention will be described.

(1) In the above-described exemplary embodiment, explanation is made of an example in which when the category to which an extension page is to be inserted already includes a Web page having another function, the name of the extension function was inserted below the name of the other function as a menu item in the menu page according to menu definition information 30 to thereby generate an extended menu page, but the extended menu page may be generated as follows. For example, an extended menu page may be generated by rearranging the function names of the Web pages and the extension function names of the extension pages belonging to each category in an ascending order of the function names and extension function names. If a degree of importance has been assigned to each of the Web pages and extension pages in advance, an extended menu page may be generated by carrying out the rearrangement in an order of degree of importance. Also, it is possible to count the number of requests from client apparatuses 200 for each of the Web pages and extension pages, and rearrange the existing function names and extension function names in each category in a descending order of the number of requests to generate an extended menu page. These modifications provide an extended menu page in which the function names and extension function names of Web pages and extension pages belonging to each category are rearranged within each category according to a prescribed rule.

(2) In the above-described exemplary embodiment, explanation is made of an example in which when a CGI program of an extension function was installed, CGI information 80 was generated. It is also possible, when a CGI program is uninstalled, to extract information of the uninstalled CGI program to generate uninstall information. In such a case, CPU 110 extracts a name of directory from which the CGI program is uninstalled, and extracts the function name corresponding to the directory name and the category name to which the function name belongs from menu definition file 30. Then, CPU 110 stores the extracted function name and category name in memory 113 as uninstall information, where the extracted function name and category name are associated with each other. Upon receipt of a request for a menu page from a client apparatus 200, CPU 110 refers to menu definition information 30, CGI information 80 and uninstall information to generate an extended menu page in such a way that the extended menu page does not include the extension function name of an extension page of the uninstalled CGI program. In this way, an extended menu page that reflects both install and uninstall of CGI programs is generated without modifying menu definition information 30 or CGI information 80.

(3) In the above-described exemplary embodiment, explanation is made of an example in which an extension page of an extension function was inserted in a single category; however, it is possible to insert extension pages in multiple categories. In such a case, if extension pages are defined by CGI programs, CGI information 80 is generated for each of the CGI programs, while if extension pages are defined by extension page definition files, the directory information is generated for each extension page definition file.

(4) Also, in the above-described exemplary embodiment, explanation is made of an example in which the directory names were the same as the category names or function names of the Web application, but in a case where the directory names are not the same as the category names or the function names, it is possible to pre-store a look-up table of the directory names in which the files of Web pages and extension pages belonging to respective category names are stored. In such a case, CPU 110 reads out the category names defined in menu information 30 one after another (step S21 of FIG. 10), and refers to the look-up table to determine the directory name(s) associated with the read-out category name. If the determined directory name(s) is included in the directory information, CPU 110 reads out an extension page definition file(s) from the directory of the determined directory name.

(5) In the above described exemplary embodiment, an information processing apparatus is described as an image-processing apparatus provided with a copy function, printer functions, etc., but the information processing apparatus may be a server apparatus provided with a Web application.

(6) In the above-described exemplary embodiment, explanation is made of an example in which the extension page definition file was written in XML language, but the extension page definition file may be written in other meta language such as SGML (Standard Generalized Markup Language).

(7) In the above described exemplary embodiment, explanation is made of an example in which image-processing apparatus 100 acquired both of the CGI program and extension page definition file, but it is possible to acquire either one of the CGI program or extension page definition file and conduct the above-described process with respect to the acquired one of the CGI program or extension page definition file.

(8) In the above-described exemplary embodiment, explanation is made of an example in which image-processing apparatus 100 was connected to the client apparatuses 200 via an intranet, but the image-processing apparatus 100 may be connected to a relay device such as a Web server so that image-processing apparatus 100 is connected to client apparatuses 200 via the relay device. In this case, the relay device has such functions as receiving a Web page request from client apparatus 200 and transferring the request to image-processing apparatus 100, and receiving the extended menu page and Web pages of various functions generated by image-processing apparatus 100 and outputting the received information to client apparatus 200.

(9) The category names used in the above-described exemplary embodiment were explained as indicating the categories of functions of Web application 10, but the category names may indicate positions of menus (such as a tab menu or a left menu) in which the menu items of the Web pages are shown, for example. Further, the category names may indicate categories of kinds of contents of Web pages (main contents, sub contents, supplementary contents such as advertisements, etc.). Thus, it is only necessary that the category names are defined by menu definition information 30 so as to be able to represent the positions in the menu page where the menu items of extension functions are to be placed.

(10) The program executed by CPU 110 in the above exemplary embodiment may be provided in a state that the program is stored in a computer readable storage medium such as a magnetic storage medium (magnetic tape, magnetic disk, etc.), optical storage medium (optical disk, etc.), magneto-optical storage medium, semiconductor memory, and so on.

Also, the program may be downloaded to image-processing apparatus 100 using suitable communications technology such as the Internet.

The foregoing description of the exemplary embodiments of the present invention is provided for the purposes of illustration and description. It is not intended to be exhaustive or to limit the invention to the precise forms disclosed. Obviously, many modifications and variations will be apparent to practitioners skilled in the art. The embodiments were chosen and described to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
 a memory that stores a Web application and structure information indicating a structure of functions predefined in the Web application;
 an acquisition unit that acquires extension page information that describes an extension function of the Web application;
 a setup unit that sets up the extension page information acquired by the acquisition unit in the memory according to a setup command;
 a determination unit that determines, based on the setup command and the structure information, an insertion position of the extension function of the extension page information in the structure of functions of the Web application;
 a request receiving unit that receives a request for generation of a Web page that represents the structure of functions of the Web application; and
 a page generation unit that, upon receipt of the request, generates an extended Web page based on the structure information stored in the memory and the insertion position determined by the determination unit, by inserting extension function information indicating the extension function into a Web page according to the structure information, wherein:
 the structure information defines function names indicating functions of the Web application and category names indicating categories of the functions;
 the extension page information is a CGI (Common Gateway Interface) program describing a content of the extension function;
 the setup command specifies a category name defining a category to which the extension function belongs and a memory region in the memory in which the CGI program is to be set up;
 the setup unit sets up the CGI program in the memory region specified by the setup command;
 the determination unit extracts the category name specified by the setup command as insertion position information indicating the insertion position of the extension function; and
 the page generation unit generates the extented Web page by inserting the extension function information of the CGI program into a portion of the Web page according to the structure information that corresponds to the category name indicated by the insertion position information extracted by the determination unit.

2. The information processing apparatus according to claim 1, further comprising an output unit that outputs information of the extended Web page generated by the page generation unit to an entity that made the request for Web page generation.

3. The information processing apparatus according to claim 1, wherein the functions of the Web application have a hierarchical structure, and the structure information indicates the hierarchical structure.

4. An information processing apparatus comprising:
a memory that stores a Web application and structure information indicating a structure of functions predefined in the Web application;
an acquisition unit that acquires extension page information that describes an extension function of the Web application;
a setup unit that sets up the extension page information acquired by the acquisition unit in the memory according to a setup command;
a determination unit that determines, based on the setup command and the structure information, an insertion position of the extension function of the extension page information in the structure of functions of the Web application;
a request receiving unit that receives a request for generation of a Wen page that represents the structure of functions of the Web application; and
a page generation unit that, upon receipt of the request, generates an extended Web page based on the structure information stored in the memory and the insertion position determined by the determination unit, by inserting extension function information indicating the extension function into a Web page according to the structure information, wherein:
the structure information includes function names of the functions of the Web application and category names indicating categories of the functions;
the memory includes directories each associated with one or more of the extension function and functions of the Web application belonging to a same category;
the extension page information is a definition file describing a Web page of the extension function in a meta language;
the setup unit sets up the definition file in a directory predetermined by the setup command from among the directories in the memory;
the determination unit determines, on the basis of the structure information and the directory in which the definition file was set up by the setup unit, a category name of a category to which the extension function of the definition file belongs as insertion position information indicating the insertion position of the extension function; and
the page generation unit generates the extended Web page by inserting the extension function information of the definition file to a portion of the Web page according to the structure information that corresponds to the category name indicated by the insertion position information determined by the determination unit.

5. The information processing apparatus according to claim 4, further comprising an output unit that outputs information of the extended Web page generated by the page generation unit to an entity that made the request for Web page generation.

6. The information processing apparatus according to claim 4, wherein the functions of the Web application have a hierarchical structure, and the structure information indicates the hierarchical structure.

7. An information processing apparatus comprising:
a memory that stores a Web application and structure information indicating a structure of functions predefined in the Web application;
an acquisition unit that acquires extension page information that describes an extension function of the Web application;
a setup unit that sets up the extension page information acquired by the acquisition unit in the memory according to a setup command;
a determination unit that determines based on the setup command and the structure information, an insertion position of the extension function of the extension page information in the structure of functions of the Web application;
a request receiving unit that receives a request for generation of a Web page that represents the structure of functions of the Web application; and
a page generation unit that, upon receipt of the request, generates an extended Web page based on the structure information stored in the memory and the insertion position determined by the determination unit, by inserting extension function information indicating the extension function into a Web page according to the structure information, wherein:
the structure information defines function names of the functions of the Web application and category names indicating categories of the functions;
the extension page information includes a CGI program describing a content of a first extension function and a definition file describing a Web page of a second extension function in a meta language;
the setup unit sets up the CGI program and the definition file acquired by the acquisition unit in the memory according to first and second setup commands associated with the CGI program and the definition file, respectively;
the determination unit determines category names of first and second categories to which the first and second extension functions of the CGI program and the definition file belong, respectively, as insertion position information, based on the structure information and the first and second setup commands of the CGI program and the definition file set up by the setup unit; and
the page generation unit judges, for each category name in the Web page according to the structure information, whether the category name has been determined as insertion position information of the CGI program by the determination unit, and if the category name has been determined as the insertion position information of the CGI program, inserts the extension function information of the CGI program into a portion of the Web page according to the structure information that corresponds to the category name, and if not, judges whether the category name has been determined as the insertion position information of the definition file by the determination unit, and if the category name has been determined as the insertion position information of the definition file, inserts the extension function information of the definition file into a portion of the Web page according to the structure information that corresponds to the category name, to thereby generate the extended Web page.

8. The information processing apparatus according to claim 7, further comprising an output unit that outputs information of the extended Web page generated by the page generation unit to an entity that made the request for Web page generation.

9. The information processing apparatus according to claim 7, wherein the functions of the Web application have a hierarchical structure, and the structure information indicates the hierarchical structure.

10. A method for processing information in a computer equipped with a memory storing a Web application and structure information indicating a structure of functions predefined in the Web application, the method comprising:
  acquiring extension page information that describes an extension function of the Web application;
  setting up the extension page information in the memory according to a setup command;
  determining, based on the setup command and the structure information, an insertion position of the extension function of the extension page information in the structure of functions of the Web application;
  receiving a request for generation of a Web page that represents the structure of functions of the Web application; and
  upon receipt of the request for Web page generation, generating an extended Web page based on the structure information and the insertion position, by inserting extension function information indicating the extension function into a Web page according to the structure information,
  wherein:
    the structure information defines function names indicating functions of the Web application category names indicating categories of the functions;
    the extension page information is a CGI (Common Gateway Interface) program describing a content of the extension function;
    the setup command specifies a category name defining a category to which the extension function belongs and a memory region in the memory in which the CGI program is to be set up;
    the CGI program is set up in the memory region specified by the setup command;
    the category name specified by the setup command is extracted as insertion position information indicating the insertion position of the extension function; and
    the extended Web page is generated by inserting the extension function information of the CGI program into a portion of the Web page according to the structure information that corresponds to the category name indicated by the extracted insertion position information.

11. A non-transitory computer-readable medium storing a program causing a computer to execute a process for processing information, the computer being equipped with a memory storing a Web application and structure information indicating a structure of functions predefined in the Web application, the process comprising:
  acquiring extension page information that describes an extension function of the Web application;
  setting up the extension page information in the memory according to a setup command;
  determining, based on the setup command and the structure information, an insertion position of the extension function of the extension page information in the structure of functions of the Web application;
  receiving a request for generation of a Web page that represents the structure of functions of the Web application; and
  upon receipt of the request for Web page generation, generating an extended Web page based on the structure information and the insertion position, by inserting extension function information indicating the extension function into a Web page according to the structure information,
  wherein:
    the structure information defines function names indicating functions of the Web application and category names indicating categories of the functions;
    the extension page information is a CGI (Common Gateway Interface) program describing a content of the extension function;
    the setup command specifies a category name defining a category to which the extension function belongs and a memory region in the memory in which the CGI program is to be set up;
    the CGI program is set up in the memory region specified by the setup command;
    the category name specified by the setup command and is extracted as insertion position information indicating the insertion position of the extension function; and
    the extended Web page is generated by inserting the extension function information of the CGI program into a portion of the Web page according to the structure information that corresponds to the category name indicated by the extracted insertion position information.

12. A method for processing information in a computer equipped with a memory storing a Web application and structure information indicating a structure of functions predefined in the Web application, the method comprising:
  acquiring extension page information that describes an extension function of the Web application;
  setting up the extension page information in the memory according to a setup command;
  determining, based on the setup command and the structure information, an insertion position of the extension function of the extension page information in the structure of functions of the Web application;
  receiving a request for generation of a Web page that represents the structure of functions of the Web application; and
  upon receipt of the request for Web page generation, generating an extended Web page based on the structure information and the insertion position, by inserting extension function information indicating the extension function into a Web page according to the structure information,
  wherein:
    the structure information includes function names of the functions of the Web application and category names indicating categories of the functions;
    the memory includes directories each associated with one or more of the extension function and functions of the Web application belonging to a same category;
    the extension page information is a definition file describing a Web page of the extension function in a meta language;
    the definition file is set up in a directory predetermined by the setup command from among the directories in the memory;
    a category name of a category to which the extension function of the definition file belongs is determined, on the basis of the structure information and the directory in which the definition file was set up, as insertion position information indicating the insertion position of the extension function; and the extended Web page is generated by inserting the extension function information of the definition file to a portion of the Web page according to the structure information that corresponds to the category name indicated by the determined insertion position information.

13. A non-transitory computer-readable medium storing a program causing a computer to execute a process for processing information, the computer being equipped with a memory storing a Web application and structure information indicating a structure of functions predefined in the Web application, the process comprising:

acquiring extension page information that describes an extension function of the Web application;

setting up the extension page information in the memory according to a setup command;

determining, based on the setup command and the structure information, an insertion position of the extension function of the extension page information in the structure of functions of the Web application;

receiving a request for generation of a Web page that represents the structure of functions of the Web application; and upon receipt of the request for Web page generation, generating an extended Web page based on the structure information and the insertion position, by inserting extension function information indicating the extension function into a Web page according to the structure information, wherein:

the structure information includes function names of the functions of the Web application and category names indicating categories of the functions;

the memory includes directories each associated with one or more of the extension function and functions of the Web application belonging to a same category;

the extension page information is a definition file describing a Web page of the extension function in a meta language;

the definition file is set up in a directory predetermined by the setup command from among the directories in the memory;

a category name of a category to which the extension function of the definition file belongs is determined, on the basis of the structure information and the directory in which the definition file was set up, as insertion position information indicating the insertion position of the extension function; and the extended Web page is generated by inserting the extension function information of the definition file to a portion of the Web page according to the structure information that corresponds to the category name indicated by the determined insertion position information.

* * * * *